Aug. 14, 1945.   J. C. CHAMBERS ET AL   2,382,773
SELF-ALIGNING BEARING STRUCTURE
Filed Jan. 2, 1943
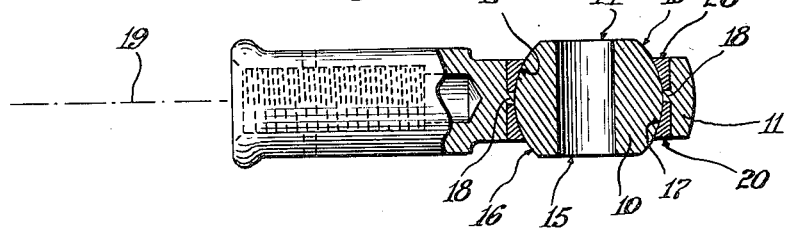
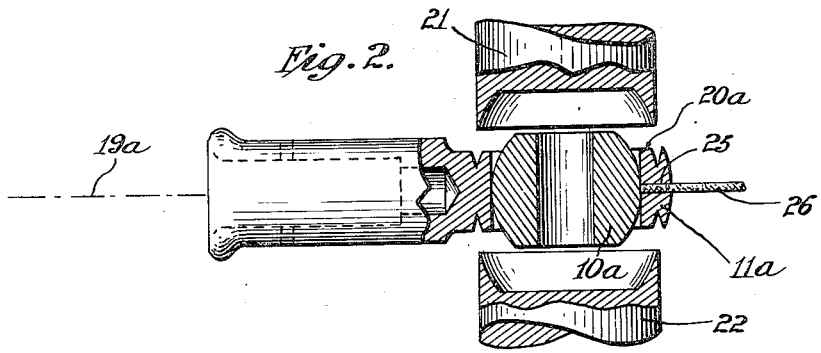
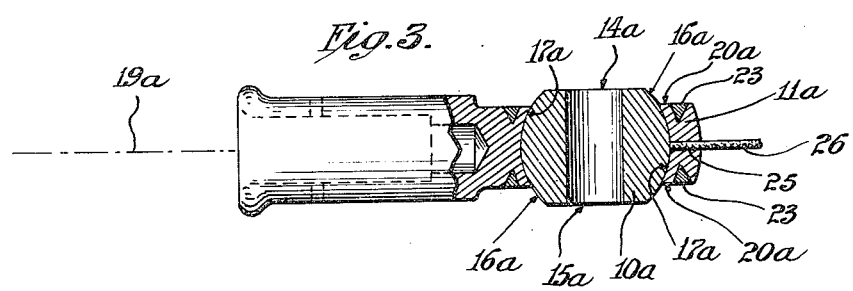
INVENTORS
Jewel C. Chambers
James R. Allen
BY
M. J. Herold
ATTORNEY Patented Aug. 14, 1945

2,382,773

UNITED STATES PATENT OFFICE 2,382,773

SELF-ALIGNING BEARING STRUCTURE

Jewel C. Chambers, Los Angeles, Calif., and James R. Allen, Forest Hills, N. Y., assignors to Simmonds Aerocessories, Inc., a corporation of New York.

Application January 2, 1943, Serial No. 471,098

3 Claims. (Cl. 308—72)

Our invention relates to improvements in self-aligning bearing structure and a method of making the same.

Several forms of self-aligning bearing structure, of the general type to which our invention relates, are shown in Patent No. 1,684,984 issued September 18, 1928 to Carl Claus and in re-issue Patent No. 18,843 to Newton Skillman.

One of the objects of our invention is to provide improved self-aligning bearing structure of the character referred to which has advantages over the various constructions proposed heretofore in the way of greater simplicity of construction and method of manufacture, capability of carrying larger design loads and of withstanding relatively higher temperatures, and of operating more smoothly.

Other objects and advantages will hereinafter appear.

For the purpose of illustrating our invention, an embodiment thereof is shown in the drawing, wherein Fig. 1 is a central, longitudinal sectional view of one form of bearing structure embodying our invention;

Fig. 2 is a view similar to Fig. 1, showing an initial step in the manufacture of a modification; and Fig. 3 shows the bearing structure completed after the machine operation in Fig. 2.

In Fig. 1, the reference numerals 10 and 11 designate, respectively, the spherical ball part and the main body part or housing, here shown as a ring shaped member, of self-aligning bearing structure. The part 10 is drilled to take a bolt, shaft, or rod end, and is flattened at the sides 14 and 15, as shown, to provide bearing area for mating parts. This part, also, has a true spherical bearing surface 16, and the part 11 has a similar bearing surface 17 complementary to and engaging the surface 16. Such parts 10 and 11 may be made of steel or other suitable hard strong materials or alloys customarily used for this purpose.

The main body part 11 is shaped so that the material thereof forms a web or flange 18 at the longitudinal axis 19. This web engages the surface 16 directly at the axis 19 to cause substantially line contact to be made between parts 10 and 11 along a plane passing through the center of the ball member however the latter turns, such plane in this case being also that of the medial horizontal axis of the ring member. Two pellets 20 of bearing or other suitable material, are melted and fill the space on opposite sides of web 18. These pellets form a spherical contact throughout the oscillating movement of part 10, and they are bonded to the main body part 11 to permit a free universal movement of part 10 without any binding.

The web 18, which is of more substantial material than pellets 20, takes most of the pull-and-thrust load, and for this reason the entire structure is capable of carrying larger loads than would otherwise be the case.

In Figs. 2 and 3, the various parts are designated by the same respective reference numerals as the corresponding parts in Fig. 1, but with the suffix $a$. In this embodiment of our invention, there is a circular V-shape groove in each side of the main body part 11a, to provide the circular portions 20a composed of the main body material in the form of an integral deformable flap at the edges of the ring opening. Suitable dies 21 and 22 are forced toward each other to form the portions 20a over simultaneously in one operation, whereby the spherical bearing surface 17a is formed complementary to such surface 16a of part 10a. Wedge-shape washers 23, of bearing or other suitable material, are staked into opposite sides of part 11a to back up the marginal bearing portions 20a, as shown in Fig. 3. On account of this novel combination and arrangement, which eliminates entirely the softer materials such as the Babbitt pellets 20 in Fig. 1 coming in contact with the spherical bearing surface 16a of part 10a, substantially larger design loads can be carried by the structure of Fig. 3.

It is to be noted that the respective bearing structures shown in Figs. 1 and 3 have several features in common. In both, the spherical ball parts 10 and 10a have a true spherical bearing surface from one side, 14 and 14a, to the other side, 15 and 15a. In both, the material of at least a portion of the main body parts 11 and 11a on both sides of the longitudinal axes 19 and 19a, is relatively soft and relatively non-abrasive (20 in Fig. 1 and 23 in Fig. 3) as compared with the material of the main body parts engaging directly the bearing surfaces 16 and 16a at the axes 19 and 19a, to take the pull-and-thrust load.

In Figs. 2 and 3 there is illustrated a small hole 25 bored through the member 11, and inserted in this hole is a piece of wick material 26 which may be lubricated with oil or a lubricant to assist in maintaining the member 10 lubricated.

It will be understood that various changes, such as in the size, shape and arrangement of the parts, can be made without departing from the spirit of our invention or the scope of the claims.

We claim as our invention:

1. A self-aligning bearing comprising, a hard metal ball member, a hard metal ring member embracing said ball member and having an inwardly extending web fitting said ball member in force transmitting relation, and separate softer metal inserts fused into place within said ring member on opposite sides of said web and slidably confining said ball member in said ring member.

2. In a self-aligning bearing, the combination comprising, a ball member, a ring member having an opening loosely accommodating said ball member, an inwardly extending web within said opening closely fitting said ball member in force transmitting relation, and a filling of fusible bearing metal bonded within said ring member on one side of said web and presenting a spherical surface mating slidably against said ball member.

3. A self-aligning bearing comprising, a ball member, a housing having a circular opening therethrough having its inner walls engaging said ball member in force transmitting relation along a plane passing through the center of the latter, and separate relatively soft and fusible metal inserts bonded to said housing above and below said plane for constricting said opening and confining said ball member.

JEWEL C. CHAMBERS.
JAMES R. ALLEN.